(12) United States Patent
Okonkwo et al.

(10) Patent No.: US 10,574,814 B2
(45) Date of Patent: Feb. 25, 2020

(54) SYSTEM AND METHOD FOR MESSAGE REDIRECTION

(71) Applicant: CHATDESK, INC., New York, NY (US)

(72) Inventors: Aneto Okonkwo, New York, NY (US); Omasiri Udeinya, New York, NY (US); Ademola Oyewale, New York, NY (US)

(73) Assignee: CHATDESK, INC., New York, NY (US)

( * ) Notice: Subject to any disclaimer, the term of this patent is extended or adjusted under 35 U.S.C. 154(b) by 0 days.

(21) Appl. No.: 16/188,351

(22) Filed: Nov. 13, 2018

(65) Prior Publication Data

US 2019/0166252 A1     May 30, 2019

Related U.S. Application Data

(60) Provisional application No. 62/590,583, filed on Nov. 26, 2017.

(51) Int. Cl.
*H04M 3/42*     (2006.01)
*H04M 3/493*     (2006.01)

(52) U.S. Cl.
CPC ..... *H04M 3/42382* (2013.01); *H04M 3/4931* (2013.01)

(58) Field of Classification Search
CPC ........... H04M 3/42382; H04M 3/4931; H04M 3/493; H04M 3/5191; H04M 3/5166; H04M 7/0027; H04M 2203/253; H04M 2203/251; H04M 2201/38; H04M 2250/74; H04M 7/0045
See application file for complete search history.

(56) References Cited

U.S. PATENT DOCUMENTS

| | | | | |
|---|---|---|---|---|
| 6,970,553 B1* | 11/2005 | Gao | ........................ | H04L 51/04 |
| | | | | 379/265.09 |
| 9,774,722 B2* | 9/2017 | Vendrow | ................ | H04L 65/403 |
| 2005/0130649 A1* | 6/2005 | Kirby | ................... | H04W 76/10 |
| | | | | 455/432.1 |
| 2006/0025109 A1* | 2/2006 | Levitan | ................. | H04M 15/10 |
| | | | | 455/406 |
| 2015/0312416 A1* | 10/2015 | Cahill | ................. | H04M 3/5166 |
| | | | | 379/266.01 |
| 2016/0150089 A1* | 5/2016 | Garg | .................... | H04M 7/003 |
| | | | | 370/352 |
| 2016/0241712 A1* | 8/2016 | Denby | ................ | H04M 3/5166 |

* cited by examiner

*Primary Examiner* — Akelaw Teshale
(74) *Attorney, Agent, or Firm* — Graeser Associates International Inc; D'Vorah Graeser

(57) ABSTRACT

A system and method for enabling a conversation to be shifted to different modalities. Optionally and preferably, the conversation between a customer and a customer representative is shifted from a voice phone call to a messaging-based system which may optionally be, for example, through SMS or short messaging system messages, self help tools or through other messaging systems, which may, for example, be operated through a mobile communication device such as a smartphone.

16 Claims, 17 Drawing Sheets

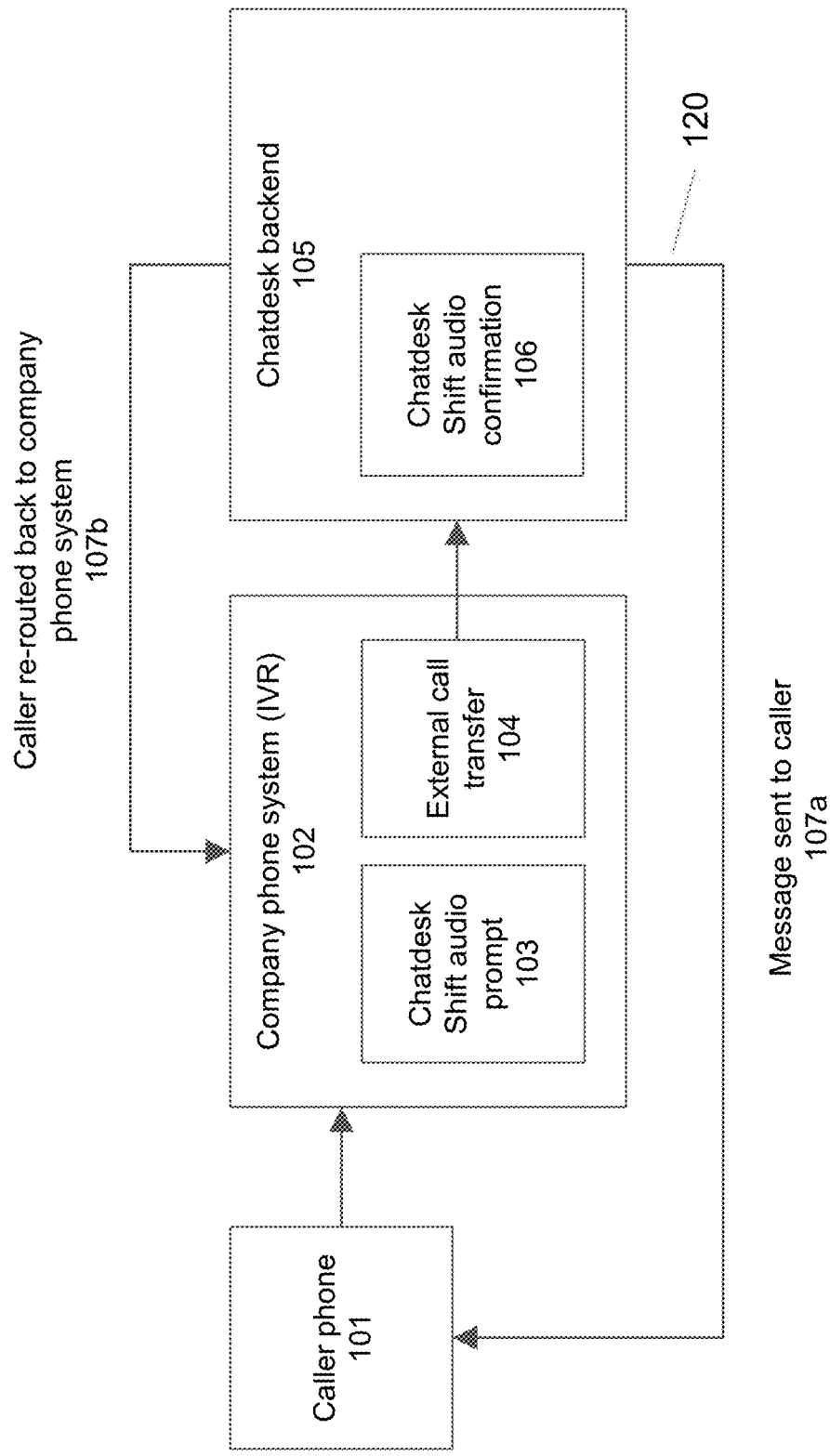

Chatdesk Shift Advanced Flow        Fig 2

Company Setup

Company decides to launch Chatdesk service and selects messaging option (e.g. SMS, Chat, Facebook)
201

↓

Chatdesk configures account for company on Chatdesk system and provides Chatdesk routing phone number to Company
202

↓

Company adds Chatdesk routing phone number to Company phone system
203

↓

Chatdesk adds company audio to Chatdesk backend
204

Fig 3

End customer flow

Customer calls company customer support
301

↓

Caller hears audio with option to shift to messaging (e.g. chat, Text, Facebook)
302

↓

Caller chooses option to shift to messaging (e.g. SMS, Chat, Facebook)
303

↓

Company phone system makes an external call to the Chatdesk routing phone number
304

↙ ↘

Chatdesk sends message to customer (e.g. SMS, Facebook Message)
305a

Chatdesk detects non-mobile caller and reroutes back to company
305b

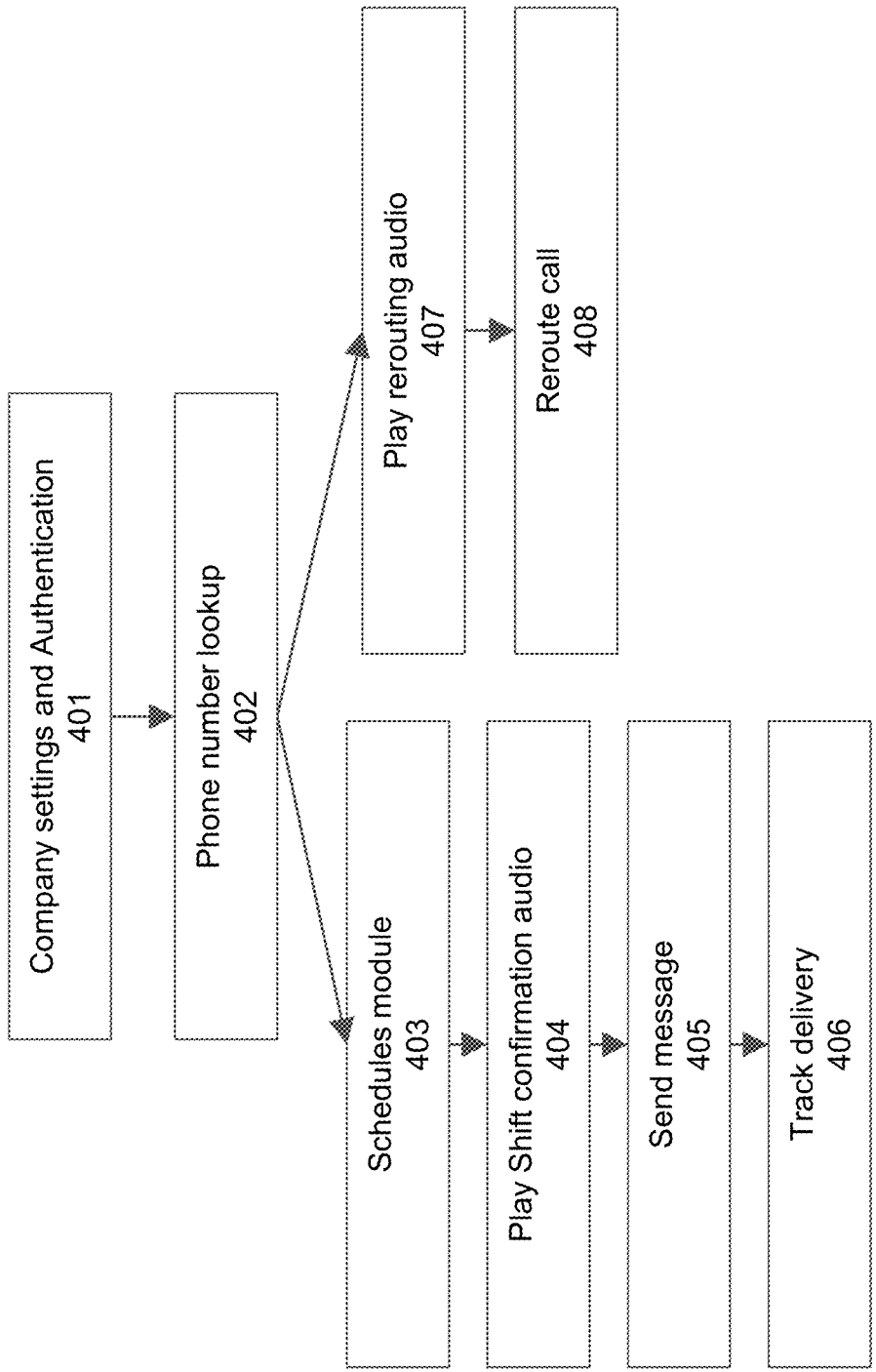

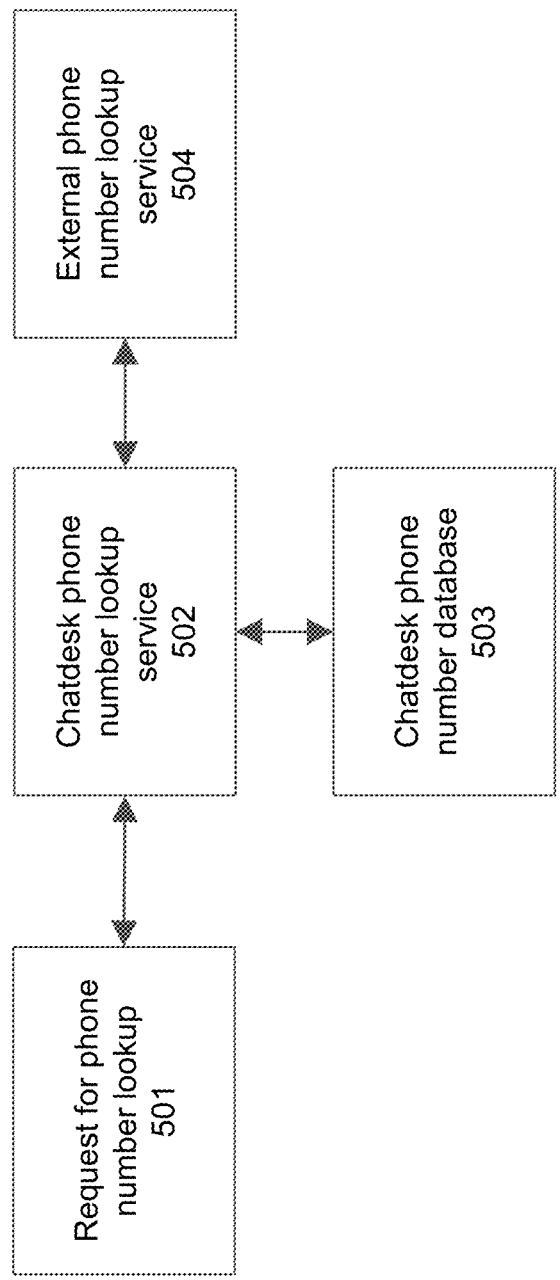

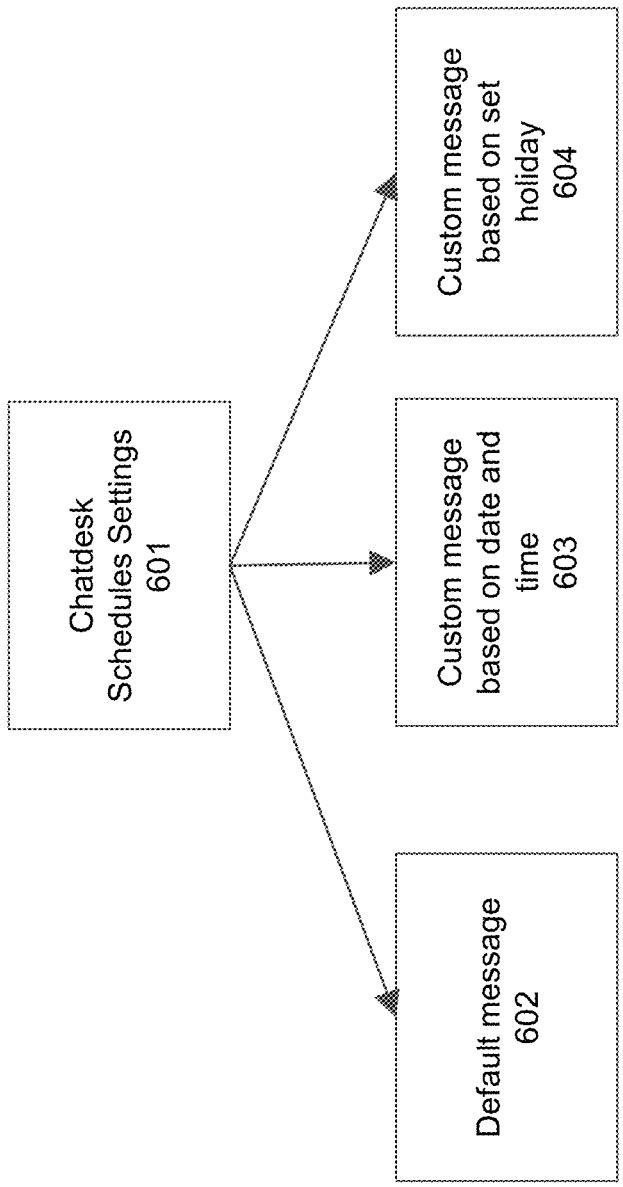

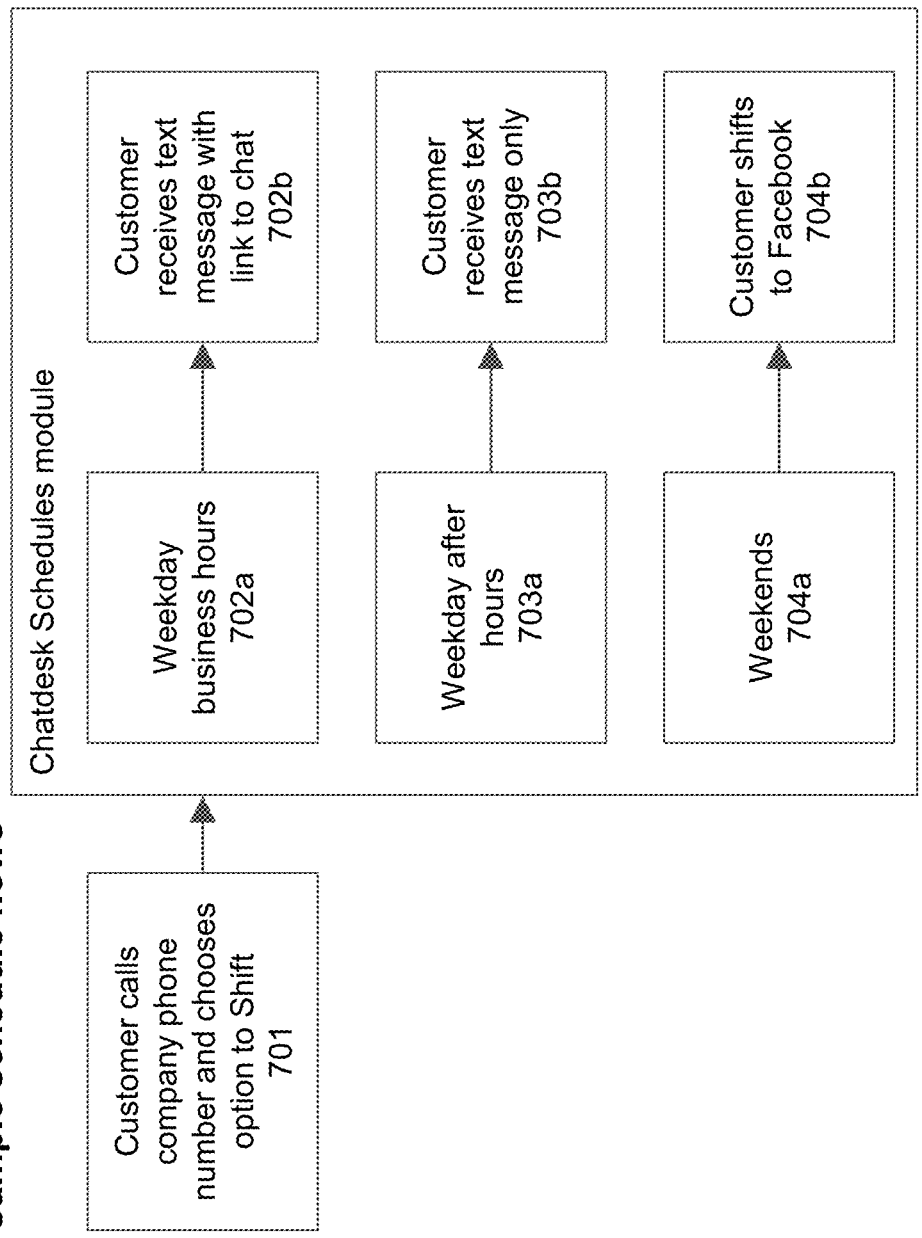

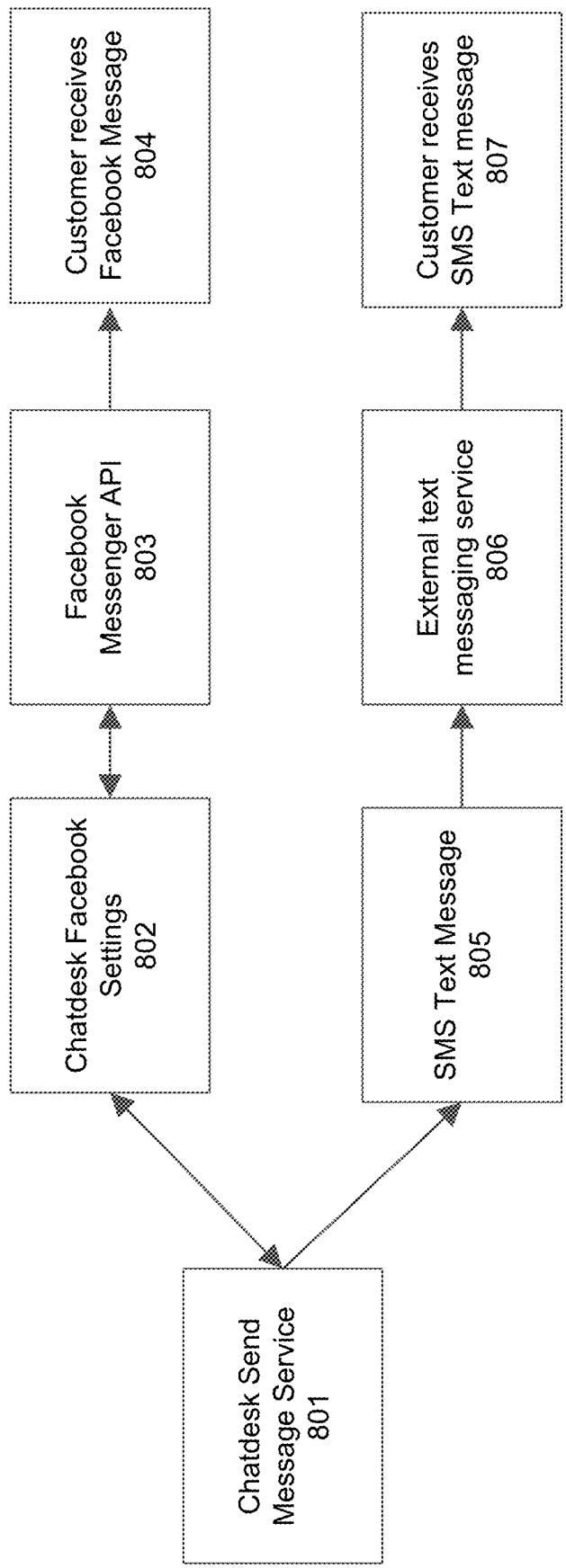

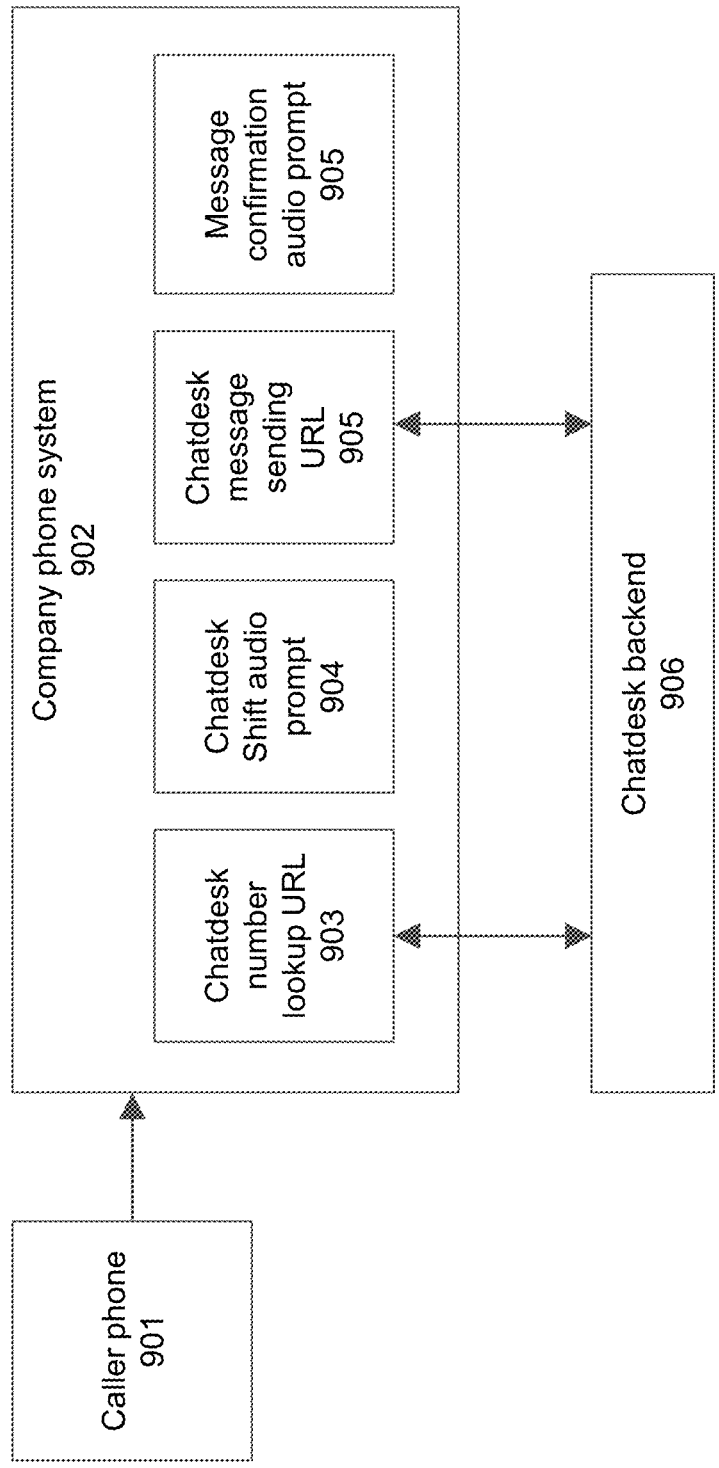

Example of Chatdesk Shift Basic (1/4)

Example of Chatdesk Shift Basic (2/4) - Chatdesk Message Sending URL Script

Example of Chatdesk Shift Basic (3/4) - Message Sending Query module

Fig 16

Company Settings and Authentication

Edit Phone Number

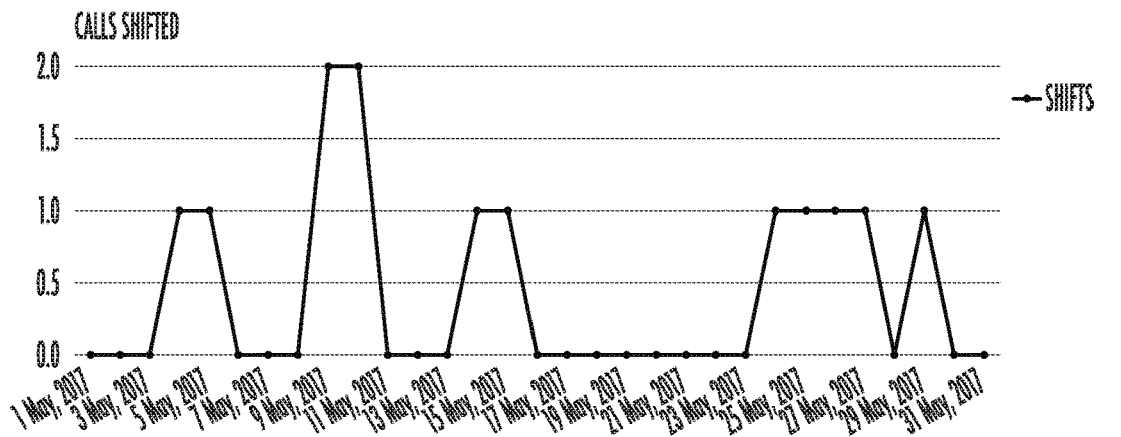
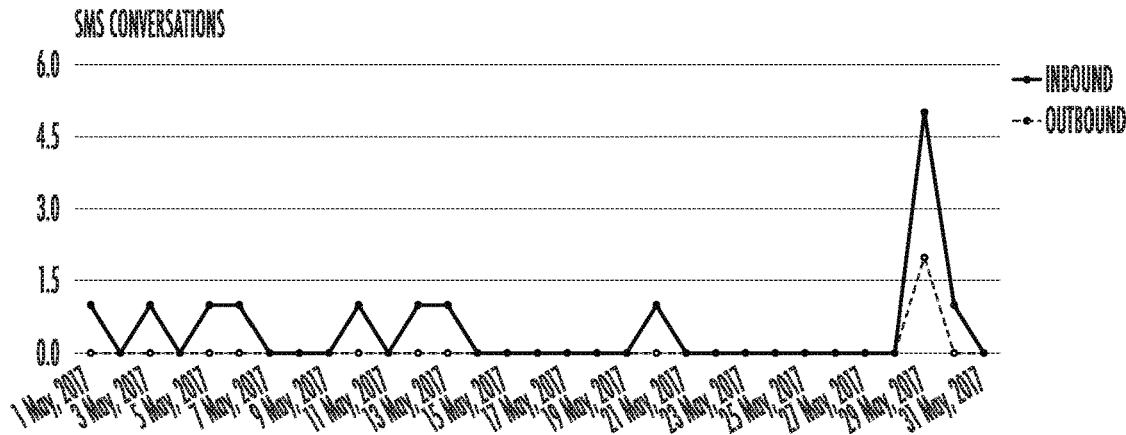
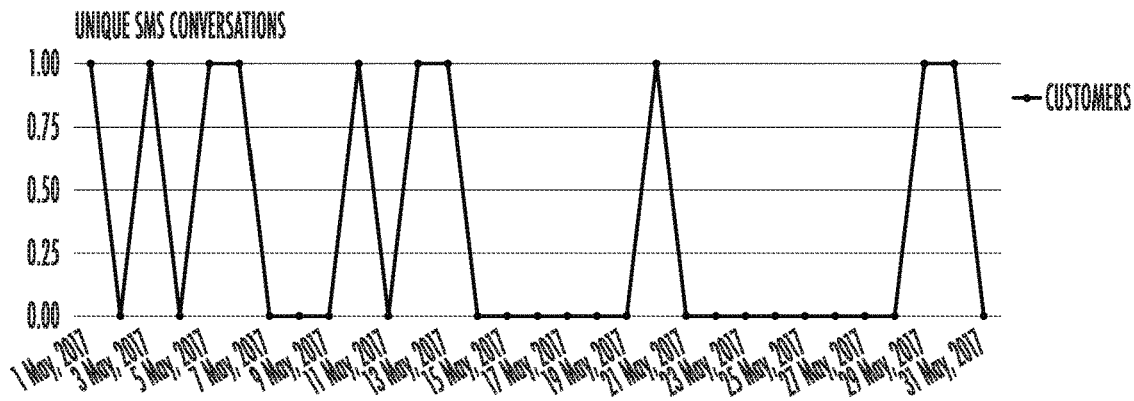
FIG. 17

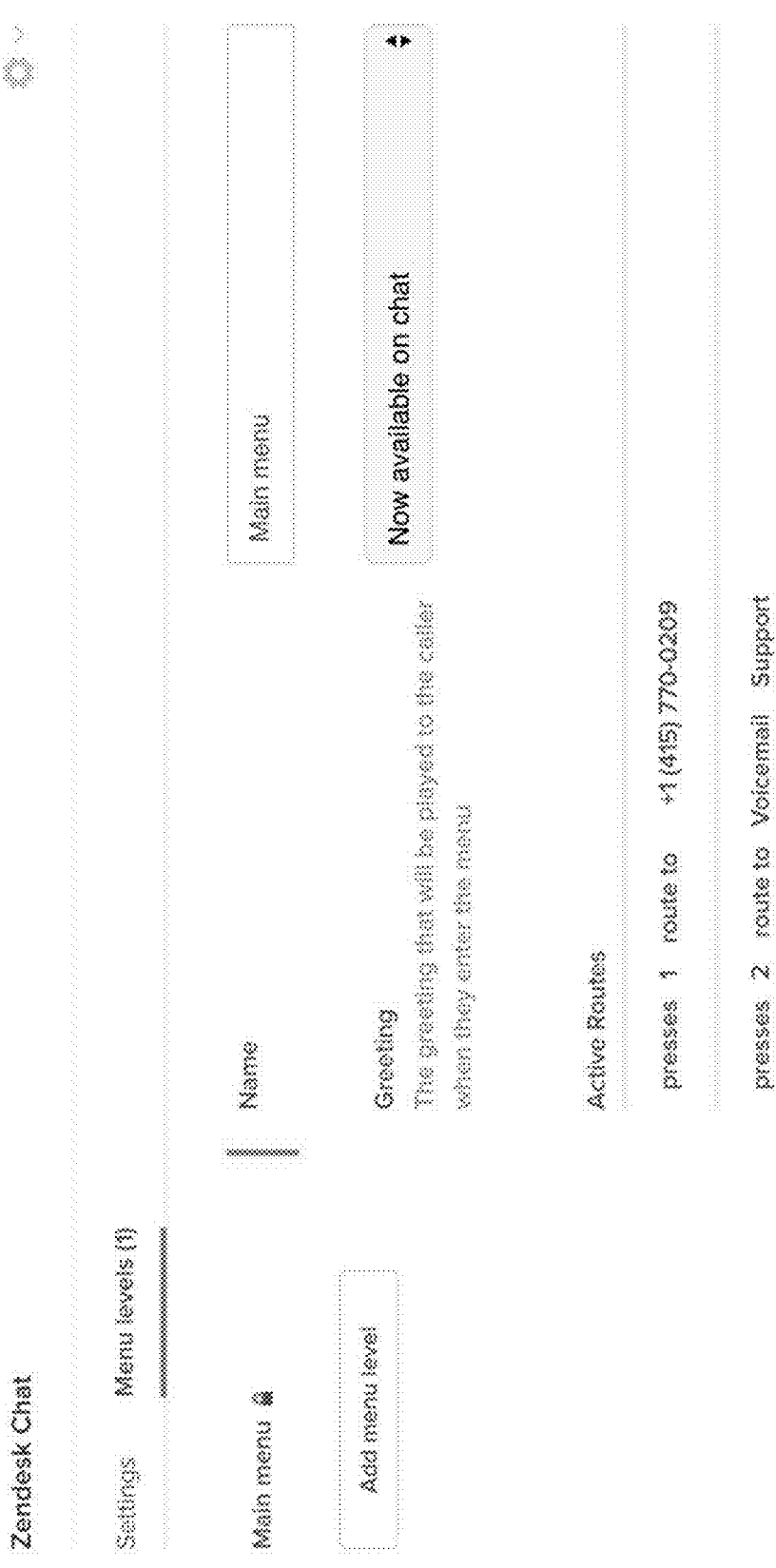

SYSTEM AND METHOD FOR MESSAGE REDIRECTION

FIELD OF THE INVENTION

The present invention relates to a system and method for message redirection, and in particular to such a system and method for redirection between communication modalities.

BACKGROUND OF THE INVENTION

IVR (interactive voice response) systems enable companies to handle larger volumes of customer calls with more precision. By enabling the customer to direct his or her call to the correct operator—or when possible, to an automated resource—companies can handle these calls more efficiently.

However IVR systems have many drawbacks. For example, customers often have to wait on hold, which can be frustrating. A further source of frustration is the imprecise nature of voice recognition, which can lead to errors as the customer attempts to navigate through systems powered by voice recognition.

On the other hand, messaging systems, such as chat systems, have the advantage of using text. Recognition and understanding of text is more developed. Such systems also enable a single human operator to interact with multiple customers simultaneously. Furthermore, customers can interact through messaging in a private manner, even in a public or noisy environment. Such systems are currently in use on websites, for example.

BRIEF SUMMARY OF THE INVENTION

The background art does not teach or suggest a system or method to bring the advantages of messaging systems to IVR. The background art also does not teach or suggest such a system or method which enables customers to switch between communication modalities as they prefer. The background art also does not teach or suggest such a system or method which enables IVR systems to accommodate customers in different ways according to various parameters, in flexible manner.

The system and method of the present invention, in at least some embodiments, provides such an ability to switch between communication modalities. The present invention, in at least some embodiments, is of a system and method for enabling a conversation to be shifted to different modalities. Optionally and preferably, the conversation between a customer and a customer representative is shifted from a voice phone call to a messaging-based system which may optionally be, for example, through SMS or short messaging system messages, or through other messaging systems, which may, for example, be operated through a mobile communication device such as a smartphone.

A customer can call a company using a voice call, but can then be offered the chance to switch to a messaging modality. For example, the customer may be told to press a certain number on the telephone keypad or state a certain command in order to switch modalities. The telephone of the customer would then receive a message that would enable the communication modality to be switched to a messaging system, including but not limited to SMS, Facebook (FB) messaging, other forms of chat, a self help portal and the like.

As described herein, the term "message" comprises one or more of a text message, a message comprising an image, a video message or an audio message, wherein the message is sent asynchronously as a discrete unit. The term "message" specifically does not relate to synchronous audio communication, which may for example occur during a telephone call.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions. For example, any instruction or function as described herein could be described as being executed according to an instruction selected from a predefined native instruction set of codes, wherein the machine codes are stored on the memory associated with a computational device performing such an instruction, and executed by the computational device's processor. Any instruction or function as described herein may be associated with a computational device and hence to be executed by that device's processor.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 1 shows a non-limiting exemplary system according to at least some embodiments for switching communication modalities;

FIG. 2 shows an exemplary non-limiting chatdesk shift advance flow according to at least some embodiments;

FIG. 3 shows a non-limiting exemplary customer flow according to at least some embodiments;

FIG. 4 shows a non-limiting exemplary flow with regard to the chatdesk backend according to at least some embodiments;

FIG. 5 shows a non-limiting exemplary system for phone number lookup according to at least some embodiments;

FIG. 6 shows a non-limiting exemplary chatdesk schedules module according to at least some embodiments;

FIG. 7 shows a non-limiting exemplary sample schedule flow according to at least some embodiments;

FIG. 8 shows a non-limiting exemplary flow for sending a message according to at least some embodiments;

FIG. 9 shows a non-limiting exemplary shift basic overview according to at least some embodiments;

FIG. 16 shows a non-limiting exemplary dashboard for company settings and authentication;

FIG. 17 shows a non-limiting exemplary dashboard to enable customers to track the number of calls that have shifted and under what circumstances; and FIG. 18 shows a non-limiting exemplary board for entering the chatdesk phone number for shifting the call.

DESCRIPTION OF AT LEAST SOME EMBODIMENTS

Figure 10:
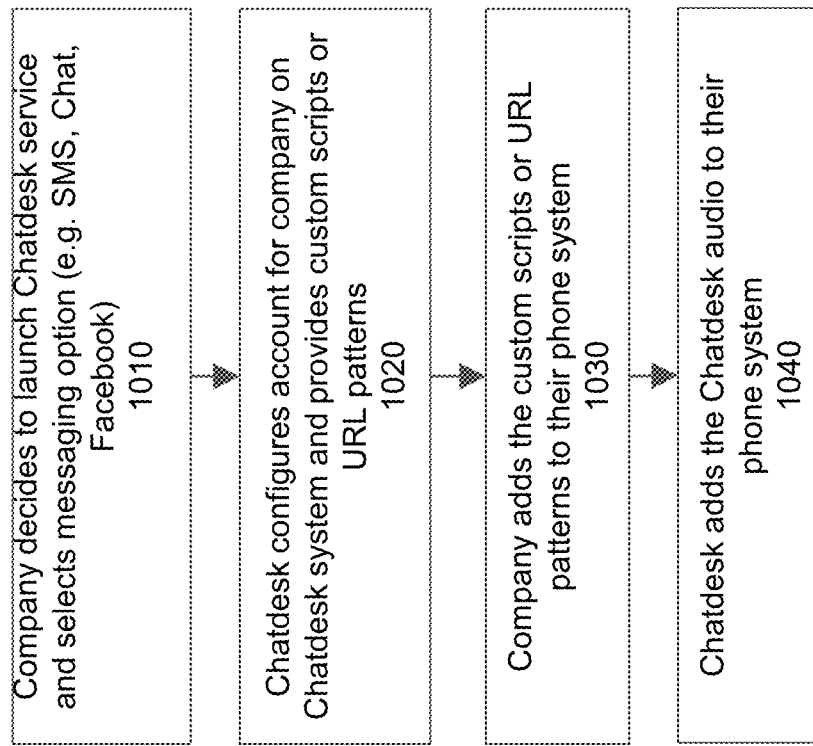
FIG. 10 shows a non-limiting exemplary flow for company setup according to at least some embodiments.

The present invention, in at least some embodiments, is of a system and method for enabling a conversation to be shifted to different modalities. Optionally and preferably, the conversation between a customer and a customer representative is shifted from a voice phone call to a messaging-based system which may optionally be, for example, through SMS short messaging system messages, or through other messaging systems, which may, for example, be operated through a mobile communication device such as a smartphone.

Turning now to FIG. 1, there is shown a non-limiting exemplary system 100. The system 100 features a caller phone 101, which is able to make voice phone calls and to receive SMS messages. The user makes a phone call through call phone 101 to a company phone system 102. Company phone system 102 is preferably an IVR (interactive voice response) system. Company phone system 102 optionally comprises a chatdesk's shift audio prompt 103 and an external call transfer 104. The shift audio prompt is preferably recognized by a chatdesk shift audio prompt 103 and may for example be a "press 1 to switch to an SMS system" or similar such message, or may be audibly recognized such as "state that you wish to shift if you wish to change to an SMS message system."

Once chatdesk shift audio prompt 103 recognizes the caller's selection after hearing the audio prompt, then the external call process begins through external call transfer 104. External call transfer 104 contacts a chatdesk backend 105. Chatdesk backend 105 features chatdesk shift audio confirmation 106, which confirms the shift and confirms what needs to occur. In one case, the caller may actually be transferred back to the company phone system 107b. This process may optionally occur, for example, if chatdesk backend 105 recognizes that according to the conditions set by the company, the shift to messaging should not be performed. Example conditions could include the type of phone the caller is using or the geographic location of the caller. For example, with regard to the type of phone, a shift to messaging may optionally only be performed if the phone can accept a shift to chat, such as with regard to a mobile phone or smart phone.

However, if the shift to messaging is set to occur, then chatdesk shift to confirmation 106 causes a message to be sent to called in process 107a. The message is sent to caller from 101, for example, as a short message system message.

In this non-limiting example, IVR 102 and chatdesk backend 105 may together comprise a server, which may perform the collective actions described herein. Each of IVR 102 and chatdesk backend 105 is operated through a computational device, which comprises a hardware processor configured to perform a predefined set of basic operations in response to receiving a corresponding basic instruction selected from a predefined native instruction set of codes, as well as memory (not shown). Chatdesk backend 105 preferably comprises connectivity to a message transfer communication channel 120. Caller phone 101 is also connected to the message transfer communication channel 120.

Each of IVR 102 and chatdesk backend 105 comprises a memory and a processor configured to perform a defined set of operations in response to receiving a corresponding instruction selected from a predefined native instruction set of codes. These codes comprise: a first set of machine codes selected from the native instruction set for receiving a prompt from caller phone 101, a second set of machine codes selected from the native instruction set for analyzing said prompt and for determining a response, wherein the response comprises shifting the voice phone call to the messaging based system, as performed for example by chatdesk shift audio prompt 103, for example by transferring control to chatdesk backend 105. A third set of machine codes selected from the native instruction set enables messages to be sent from chatdesk backend 105 to caller phone 101 through message transfer communication channel 120. Each of the first, second and third sets of machine code is stored in the memory of the computational device operating the above described modules.

FIG. 2 shows an exemplary non-limiting chatdesk shift advance flow 200. This flow is for a company setup. In stage 201, the company decides to launch the chatdesk service and selects the messaging action. In the previous example, the messaging action was given as SMS, but it may also optionally be Facebook (FB) messaging, other forms of chat, et cetera. For example, for Facebook messaging, the system optionally uses the customer's phone number in the FB Messenger Customer Matching API to check whether the customer has an active FB Messenger account. If the customer has FB Messenger, the system may optionally send the customer a message, which could be customized. The system would need a Facebook page for the company that wishes to send the message as well.

In stage 202, the account is configured on the system and the shifting phone number is provided to the company. The shifting phone number is needed because, as described in the previous system, in order for a message to be sent to the caller phone, the company needs to have a shifting phone number. Also in order for the company IVR to communicate with the chatdesk system, the shifting phone number is needed. Next in stage 203, the company adds the chatdesk shifting phone number to the company phone system, to contact the chatdesk backend. The shifting phone number is used by the phone system as for any other phone number. Next, the company audio is added to the chatdesk backend in stage 204, for example, to give an audio confirmation message which the user listens to after a message is sent to the caller.

FIG. 3 shows a non-limiting exemplary customer flow 300. In stage 301, the customer calls company customer support, or indeed any other phone line associated with the company. In stage 302, the caller hears the audio through the caller phone, with an option to shift to messaging, as previously described. The caller then chooses the option to shift to messaging, either by pressing a button or with an audio prompt. This may also use a default such as the user does not actively select to go to a voice function, then the caller is automatically shifted to messaging through the caller phone. The company phone system makes an external call to the chatdesk shifting phone number in stage 304. The chatdesk backend decides how to handle such a call. The chatdesk backend may send a message to the customer in stage 305a or alternatively, if the chatdesk detects a non-mobile phone or particular geographic location, may transfer the call back to the company in stage 305b (and specifically to the IVR of the company). Other options include if the backend system detects that the timing for making such a call is not correct, or some other point as to why a shift to a messaging system may not be made, then the call may be transferred back to the company voice system.

FIG. 4 shows a non-limiting exemplary flow 400 with regard to the chatdesk backend. The company settings and authentication are checked in stage 401. Next, the phone number lookup is performed in stage 402. This optionally is then connected to a schedules module 403, which is connected to a play shift confirmation audio 404, the message is sent in 405, and the message delivery is tracked in 406. Optionally, alternatively or additionally, the transfer audio is set in 407, and the call is transferred in module 408.

FIG. 5 shows a non-limiting exemplary system 500 for phone number lookup. A request is for phone number lookup in module 501. Phone number service is contacted in 502. The backup phone number lookup service 502 then contacts the phone number database 503 to see whether the phone number already exists in the database. If the phone number is not available in the database, then the system contacts the external phone number lookup service. The results from the external phone number service are subsequently stored in the database for future use 504.

FIG. 6 shows a non-limiting exemplary chatdesk schedules module 600. The chatdesk schedules setting 601 are determined according to the needs of the company, so for example, for certain hours, there may be a human available on voice. For other hours, which optionally may be overlapping or which may not be overlapping, there may be a messaging system which is available, and for still other hours, optionally none of these options are available the user is instructed to leave a message. The message may be left as voice mail; alternatively, the message may be left through a messaging system. chatdesk schedules setting 601 determines all of the settings for the various messages and when they should be played. Next, a default message 602 may be played in the case of none of the above or when the system is active. A custom message based on time and date may optionally be played in 603, and a custom message based on set holiday may also be played in 604.

FIG. 7 shows a non-limiting exemplary sample schedule flow 700. In stage 701, the customer calls the company phone number and choose an option to shift. Now the chatdesk schedules module option performs the following process: during weekday business hours 702a, the customer sees a text message with a link to chat in 702b. This is because chat is now active. For weekday after hours in 703a, the customer sees a text message only in 703b, for example saying, "Sorry you missed us. We are now closed" and indicating when the user can contact customer support or the company generally at another time. Weekends, 704a, customer optionally shifted to Facebook in stage 704b.

FIG. 8 shows a non-limiting exemplary flow 800 for sending a message. The message service 801 is invoked to send a message back to the customer. Depending on how the company has configured this, there are a number of different possibilities. For example, optionally, send a message service 801 determines the Facebook settings 802 for that particular company and then contacts the Facebook messenger API in stage 803. As a result, the customer sees a Facebook message in stage 804. Alternatively or additionally, an SMS text message is sent in stage 805. In order for this to occur, an external text messaging service is contacted in stage 806, and the customer sees the SMS text message in stage 807.

FIG. 9 shows a non-limiting exemplary shift basic overview 900. Caller phone 901 contacts company phone system 902. A number of processes are then invoked. The number lookup URL module 903 is contacted, for example, in order to determine whether or not there's a mobile phone and also determine what the phone number is. For example, optionally the format for the lookup URL may comprise http://someexample.com/shift/lookupNumber.xml?vcid=xxxx&authKey=xxxx&fromNumber=1 6xxxxxx. For XML, the format of the response optionally comprises:

```
<phoneNumberType>mobile</phoneNumberType>
<status>200</status>
<msg></msg>
<countryCode>NG</countryCode>
        For JSON, the format of the response optionally comprises:
{
"phoneNumberType": "mobile",
"status": 200,
"msg":"random message",
"countryCode": "US"
}
```

This information is sent to the chatdesk backend 906. The chatdesk shift audio prompt 904 is invoked within the system, asking the user if the user is in fact interested in shifting to a message system. The chatdesk message sending URL 905 is then sent to the chatdesk backend 906 in order to determine what the message URL is. For such a shift URL, for a company IVR optionally the following format is used:

http://someexample.com/shift/shift.xml?vcid=xxxx&authKey=xxxx&fromNumber=16xxxxxx For XML, the format of the response is as follows:

<smsMessage status="200"/>

For JSON, the format of the response is as follows:

{"smsMessage": "status":"200"}

If the company does not have a full IVR, but rather a partial IVR (such as that provided through Twilio for example), then optionally the following URL is used:

http://someexample.elasticbeanstalk.com/shift/shiftadv.xml?vcid=xxx&authKey=xxxxx&fromNumber=16xxxxx For XML, the format of the response is as follows:

<smsMessage status="200"/>

For JSON, the format of the response is as follows:
{"smsMessage": "status":"200"}

Partial IVR systems may not have all of the functionality of a full IVR, but are still able to handle voice and SMS messaging interactions.

The message confirmation audio prompt is then in 905.

FIG. 10 shows a non-limiting exemplary flow for company setup. In stage 1010, the company decides to launch the chatdesk service and selects the messaging option. Then, the account is configured for the company and the system in providing custom scripts or URL patterns in stage 1020. The company adds the custom scripts and URL patterns to their phone system in stage 1030. In this case, for this to occur, the phone system needs to sufficiently sophisticated to accept custom scripts or URL patterns. In the previous example, only a phone number is required because the system was quite basic and was only able to accept a phone number forwarding. Alternatively, even in a more sophisticated system, the company may choose simply to use the phone number forwarding for ease of use. The company adds the custom scripts or URL patterns to their phone system in stage 1030 and the chatdesk audio is added to their phone system in stage 1040 in order for the audio prompts to be made.

Figure 11:
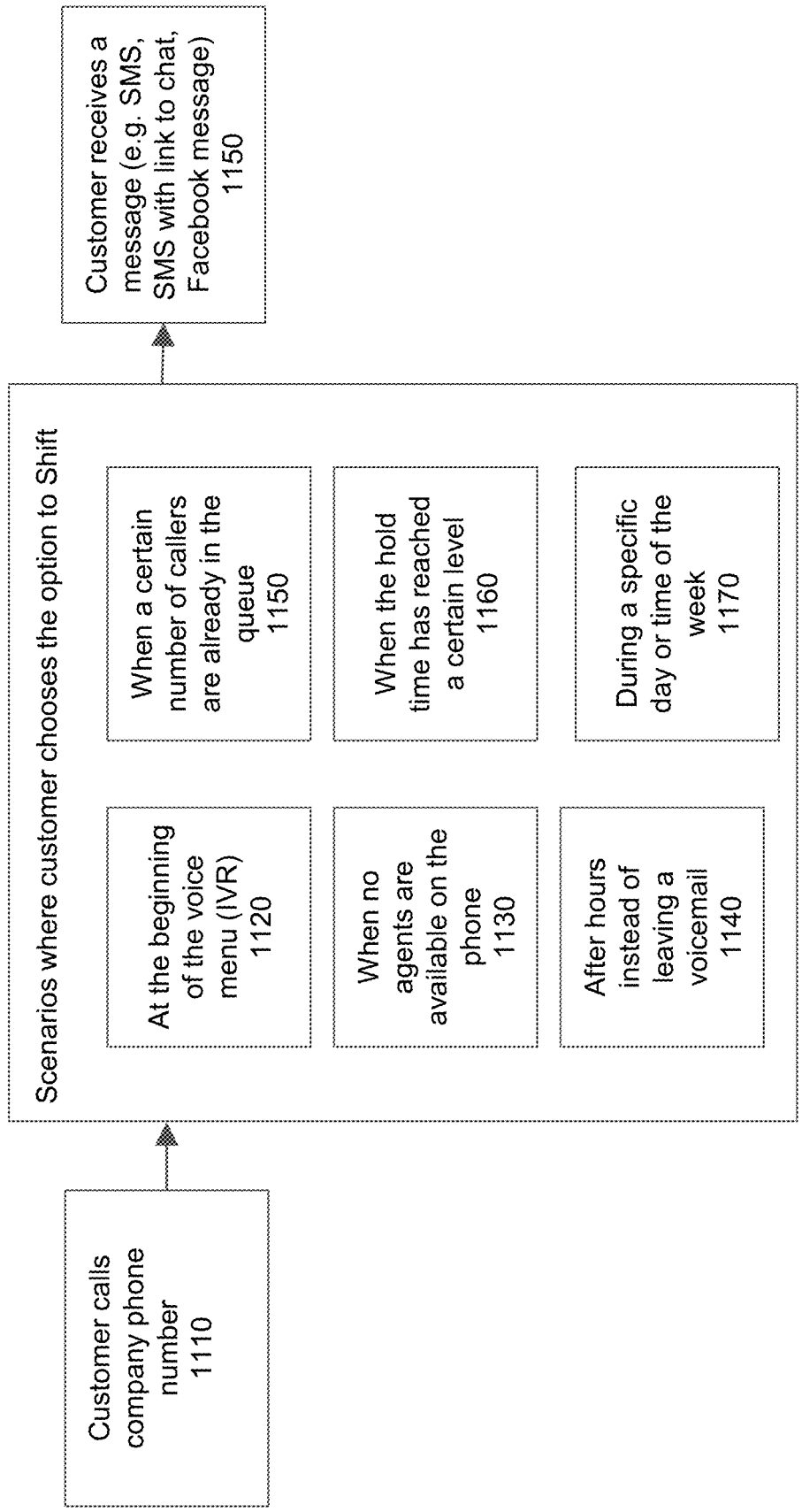
FIG. 11 shows an exemplary flow for a customer interaction according to at least some embodiments.

FIG. 11 shows an exemplary flow 1100. The customer calls the company phone number in stage 1110. Various scenarios may optionally then be performed. When the customer chooses the option to shift which are selected, and which may be invoked. For example, the beginning of the voice menu IVR in stage 1120, when no agents are available on the phone in stage 1130, after hours instead of leaving a voice mail in stage 1140, when a certain number of callers are already in the queue in stage 1150, and the hold time has reached a certain level in stage 1160, during a specific time or time of the week in stage 1170. Optionally, multiple different scenarios may be determined and examined in order to determine by time to wait, or preponderance of callers or any other different calculation method whether or not a shift should be invoked.

If a shift is to be invoked, then the customer sees a message with the link to messaging, as previously described in stage 1150.

Figure 12:
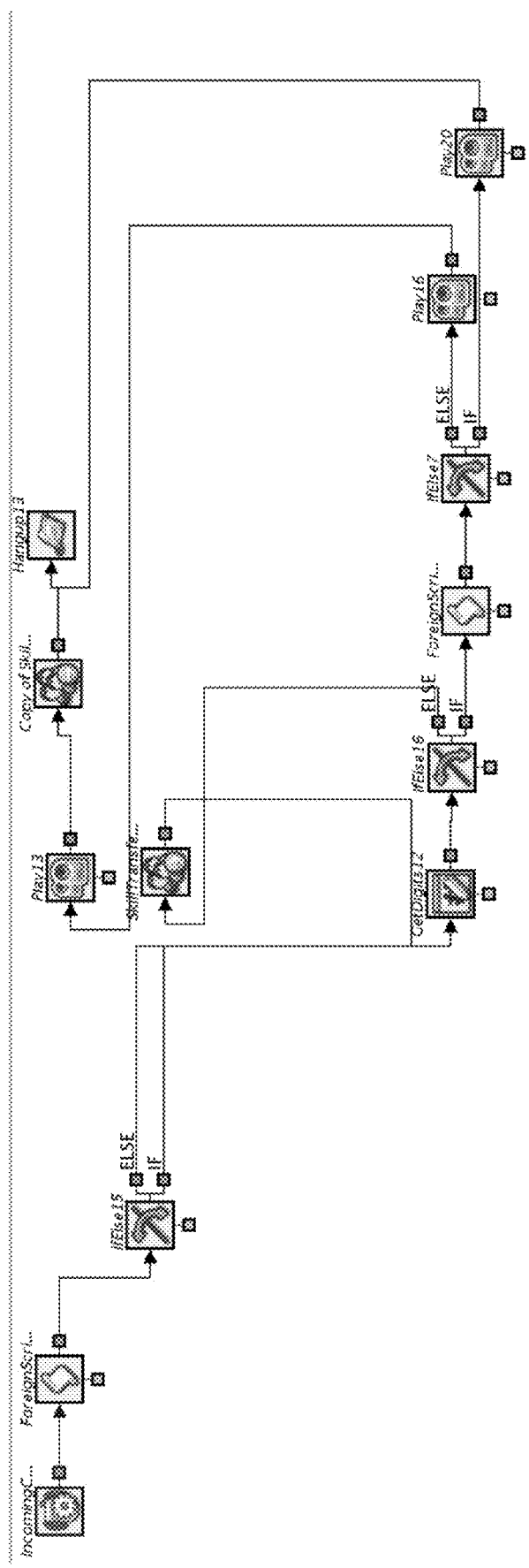
FIGS. 12-15 show a method for shifting, according to at least some embodiments.

FIG. 12 shows a system 1200 for shifting, as one of four figures. So an incoming call is shown, a foreign script is then invoked, and if else is invoked. Next, the digits are determined depending on the script results, either this is transferred to a skilled transfer, and if not continues on to the script. In another optionally either one of two messages are played for example, to encourage the shift to messaging or to cause the user to leave a message, et cetera. Depending on which one is invoked, optionally this may lead to the message being sent but then hanging up because messaging is not possible or alternatively, for further messages to be played in order to invoke the shift.

Figure 13:
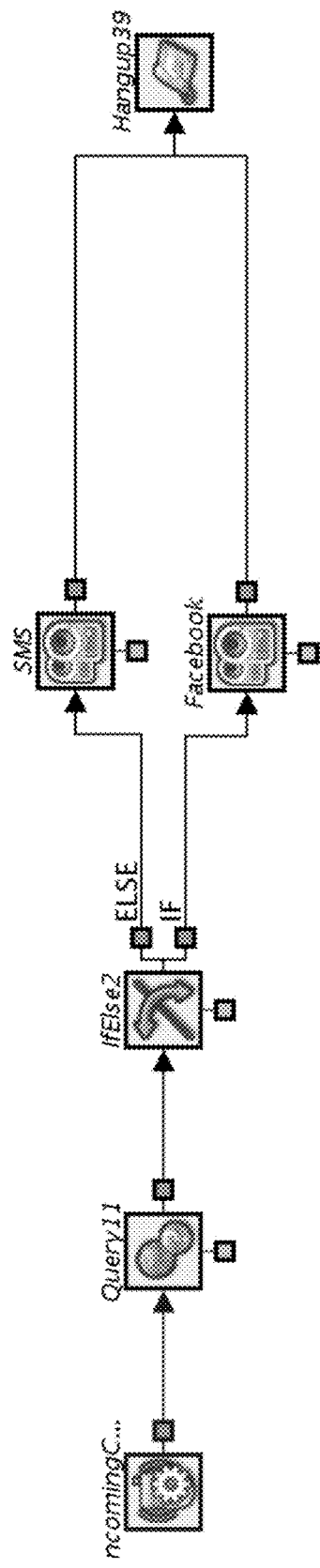

FIG. 13 shows a non-limiting exemplary method for sending the URL script. The incoming call is made, a query is made as to whether the user is interested, and if the user answers affirmatively, then a message is sent. Alternatively, if the user is not interested in messaging, or also alternatively if the user is not a mobile phone device or is on a mobile phone device which can accept Facebook, then a Facebook method is sent.

Figure 14:
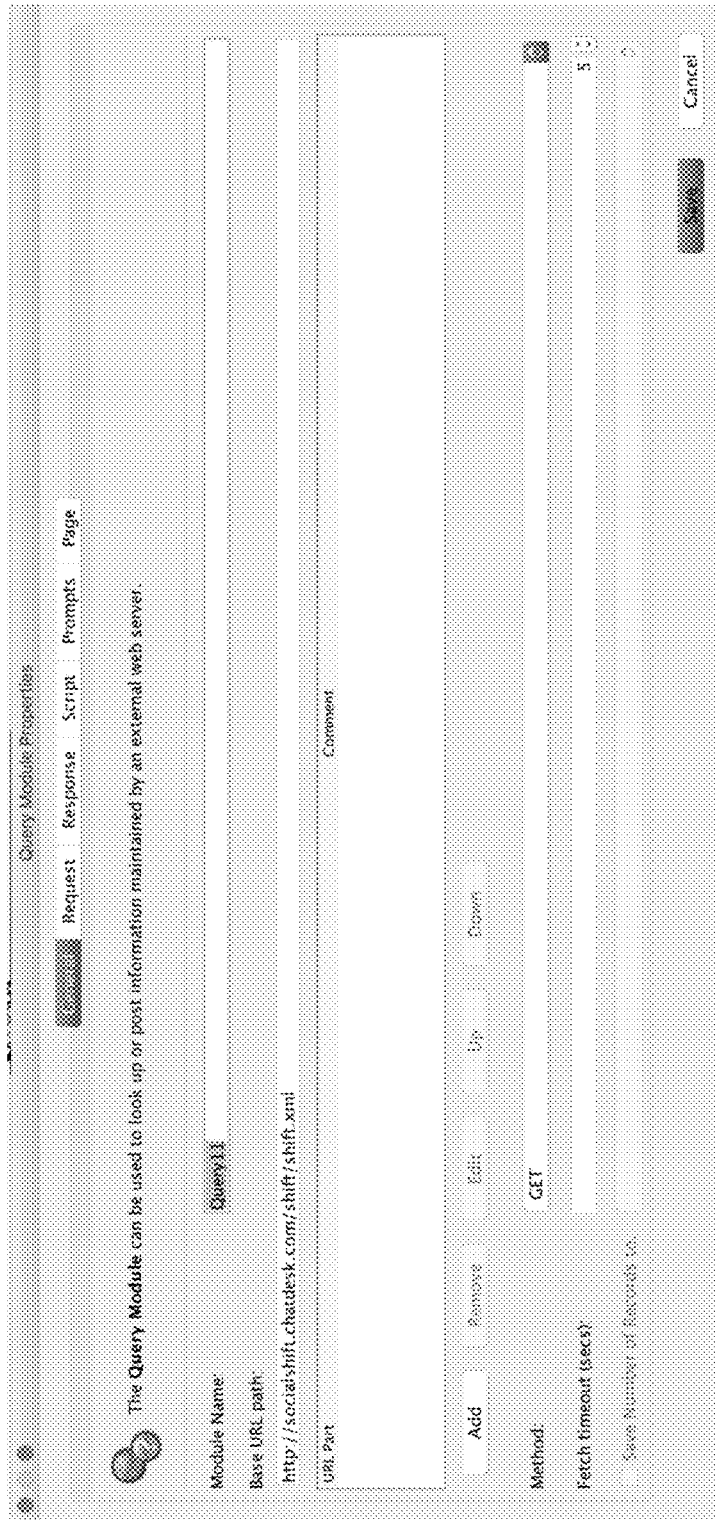

FIG. 14 shows the dashboard for the query module which can be used to look up or post information maintained by the external web server. So a basic URL path is sent and that URL path is determined to allow the external web server to communicate with the backend.

Figure 15:
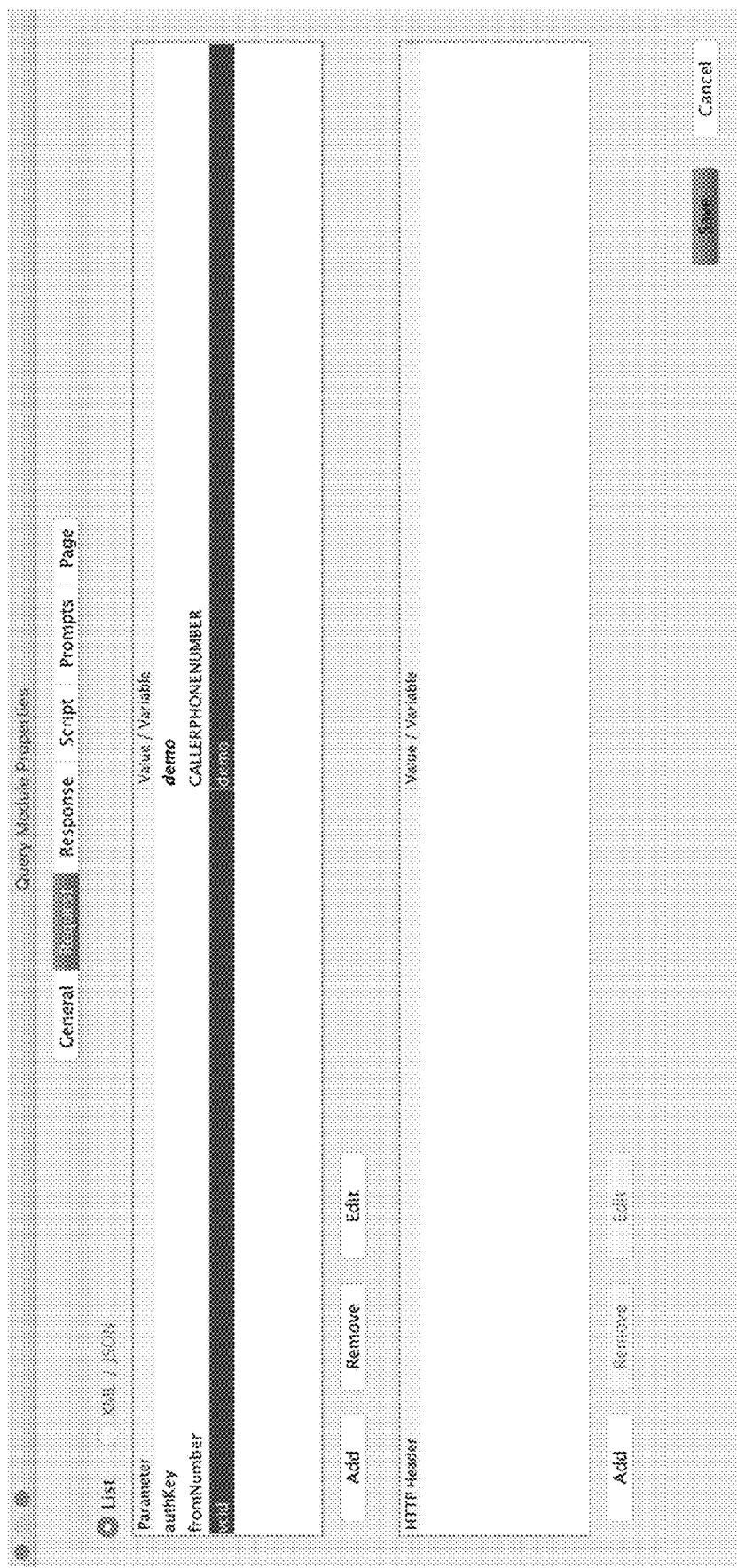

FIG. 15 shows a message query sending module, which again, includes parameters such as the phone number, whether or not the authorization key is there, the caller phone number, et cetera.

Figure 16:
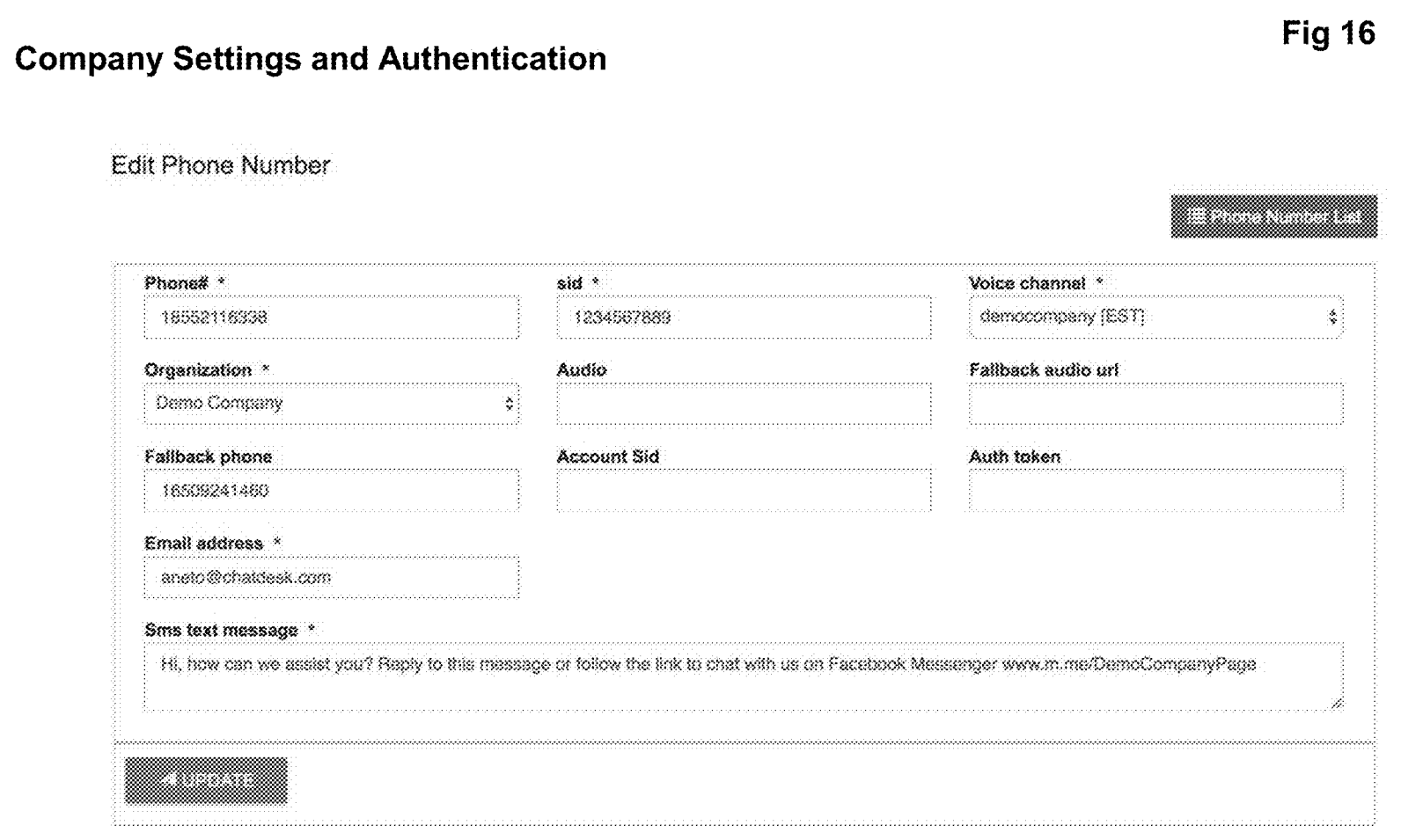

FIG. 16 shows a non-limiting exemplary dashboard for company settings and authentication, showing how to edit the initial phone number, the fallback phone, et cetera, as well as the SMS text message.

FIG. 17 shows a non-limiting exemplary dashboard to enable customers to track the number of calls that have shifted and under what circumstances.

FIG. 18 shows a non-limiting exemplary board for entering the chatdesk phone number for shifting the call, along with the greeting the user will hear, and also what will happen when they press various numbers on their phone.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for enabling a conversation to be shifted to different modalities, comprising a customer telephone and a customer representative voice system, wherein said customer telephone is capable of communicating through messaging; wherein said customer representative voice system comprises a server and connectivity to a message transfer communication channel, wherein said customer telephone is also connected to said message transfer communication channel, said server comprising a memory and a processor configured to perform a defined set of operations in response to receiving a corresponding instruction selected from a predefined native instruction set of codes, said codes comprising:

a first set of machine codes selected from the native instruction set for receiving a prompt from said customer telephone, said prompt indicating selection of an option to shift a conversation between said customer telephone and said customer representative voice system from a voice phone call to a messaging based system;

a second set of machine codes selected from the native instruction set for initiating, in response to said prompt, said shift;

a third set of machine codes selected from the native instruction set for determining, in response to said initiation, whether said shift shall be made or not comprises considering the geographic location of customer telephone, time of making said shift, or a combination of both;

a fourth set of machine codes selected from the native instruction set for determining a response, wherein said response comprises:
- if it is determined that said shift shall be made, shifting said conversation from said voice phone call to said messaging based system, and
- if it is determined that said shift shall not be made, rerouting said conversation back to said voice call; and a fifth set of machine codes selected from the native instruction set for inducing said response, such that when the response comprises said shifting, said customer telephone communicates with said customer representative voice system through a message sent from said server through said message transfer communication channel;

a sixth set of machine codes selected from that native instruction set for determining when said prompt occurs during a customer flow;

wherein each of the first, second, third, fourth, fifth, and sixth sets of machine code is stored in the memory.

2. The system of claim 1, wherein said message transfer communication channel comprises one or more of SMS (short messaging system) messages, Facebook (FB) messaging, other forms of chat, self help tools or a combination thereof.

3. The system of claim 2, wherein said customer telephone comprises a smartphone.

4. The system of claim 3, wherein said server comprises a chatdesk shift audio prompt for determining that the conversation is to be shifted to said messaging-based system.

5. The system of claim 4, wherein said chatdesk shift audio prompt causes a seventh set of machine codes selected from the native instruction to be executed by said server, to determine if a phone number associated with said customer telephone is associated with a Facebook account, and if so, to induce communication through said message transfer communication channel through FB messenger according to said Facebook account.

6. The system of claim 4, wherein said chatdesk shift audio prompt causes a seventh set of machine codes selected from the native instruction to be executed by said server, to determine a phone number associated with said customer telephone and to induce communication through said message transfer communication channel through SMS message service.

7. The system of claim 4, wherein said server comprises a lookup URL module and said chatdesk shift audio prompt sends a request through a lookup URL to said lookup URL module to determine a telephone number associated with said customer telephone, wherein said lookup URL module returns said telephone number to said chatdesk shift audio prompt.

8. The system of claim 7 wherein said telephone number is determined by said lookup URL module to be unable to receive communication through said message transfer communication channel, such that said chatdesk shift audio prompt causes said customer telephone to re-engage in said voice call.

9. The system of claim 7, wherein said customer representative voice system comprises an IVR (interactive voice recognition) system and wherein the conversation is initiated as a voice call through said customer telephone.

10. The system of claim 9, wherein said prompt from said customer telephone comprises a voice audio prompt or a keypad prompt entered through said customer telephone, to cause said chatdesk shift audio prompt to initiate said shift to a messaging system.

11. A method for enabling a conversation to be shifted to different modalities, comprising providing a system according to claim 1; initiating a voice call through said customer telephone; determining when a prompt by said customer telephone occurs during a customer flow; receiving said prompt by said customer telephone to shift to said messaging-based system; initiating, in response to said prompt, said shift determining, in response to said initiation, whether said shift shall be made or not determining a response, wherein said response comprises:
- if it is determined that said shift shall be made, shifting said conversation from said voice phone call to said messaging based system, and
- if it is determined that said shift shall not be made, rerouting said conversation back to said voice call; and
- inducing said response.

12. The system of claim 1, wherein determining whether said shift shall be made or not comprises evaluating the capability of the customer telephone to communicate via said messaging based system.

13. The system of claim 1, wherein different messages and different links can be sent to the customer telephone after determining whether said shift shall be made, where the different messages and different links are based on the geographic location of the customer telephone or on the time of the day of making the shift.

14. The system of claim 1, wherein determining when said prompt occurs during a customer flow comprises considering at the beginning of a voice menu (IVR), when no agents are available for the voice phone call on said customer representative voice system, after hours instead of leaving a voicemail, when a certain number of callers are already in the queue of said customer representative voice system, when hold time has reached a certain level in said customer representative voice system, and during a specific day or time of the week.

15. The system of claim 1, the system uses the customer's phone number in the FaceBook (FB) Messenger Custom Matching API to determine whether the customer has an active FB Messenger account before shifting.

16. A system for enabling a conversation to be shifted to different modalities, comprising a customer telephone, a customer computational device and a customer representative voice system, wherein said customer computational device is capable of communicating through messaging, wherein the conversation is initiated as a voice phone call between said customer telephone and said customer representative voice system; wherein said customer representative voice system comprises a server and connectivity to a message transfer communication channel, wherein said customer computational device is also connected to said message transfer communication channel, said server comprising a memory and a processor configured to perform a defined set of operations in response to receiving a corresponding instruction selected from a predefined native instruction set of codes, said codes comprising:
- a first set of machine codes selected from the native instruction set for receiving a prompt from said customer telephone, said prompt indicating selection of an option to shift a conversation between said customer telephone and said customer representative voice system from a voice phone call to a messaging based system;

a second set of machine codes selected from the native instruction set for initiating, in response to said prompt, said shift;
a third set of machine codes selected from the native instruction set for determining, in response to said initiation, whether said shift shall be made or not comprises considering the geographic location of customer telephone, time of making said shift, or a combination of both;
a fourth set of machine codes selected from the native instruction set for determining a response, wherein said response comprises:
  if it is determined that said shift shall be made, shifting said conversation from said voice phone call to said messaging based system, and
  if it is determined that said shift shall not be made, rerouting said conversation back to said voice call; and
a fifth set of machine codes selected from the native instruction set for inducing said response, such that when said response comprises said shifting, said customer computational device communicates with said customer representative voice system through a message sent from said server through said message transfer communication channel;
a sixth set of machine codes selected from that native instruction set for determining when said prompt occurs during a customer flow;
wherein each of the first, second, third, fourth, and fifth sets of machine code is stored in the memory.

* * * * *